US008977428B2

(12) United States Patent
Endo et al.

(10) Patent No.: US 8,977,428 B2

(45) Date of Patent: Mar. 10, 2015

(54) VEHICLE DRIVE SUPPORT DEVICE

(75) Inventors: Masato Endo, Susono (JP); Yuki Yamada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 41 days.

(21) Appl. No.: 13/203,914

(22) PCT Filed: Mar. 6, 2009

(86) PCT No.: PCT/JP2009/054311

§ 371 (c)(1), (2), (4) Date: Aug. 30, 2011

(87) PCT Pub. No.: WO2010/100759

PCT Pub. Date: Sep. 10, 2010

(65) Prior Publication Data

US 2011/0313609 A1 Dec. 22, 2011

(51) Int. Cl.

*B60T 7/12* (2006.01)
*B60Q 1/00* (2006.01)
*G06F 7/00* (2006.01)
*G08G 1/0967* (2006.01)

(52) U.S. Cl.

CPC .... *G08G 1/096716* (2013.01); *G08G 1/096758* (2013.01); *G08G 1/096783* (2013.01)

USPC ............... 701/36; 701/45; 701/302; 340/435; 180/168

(58) Field of Classification Search

CPC ............................. B60W 10/18; G08G 1/0968

USPC ........... 701/45, 36, 70, 93, 96, 117, 118, 119, 701/302; 340/435, 438, 436; 180/167, 168, 180/170

See application file for complete search history.

(56) References Cited

U.S. PATENT DOCUMENTS 6,567,010 B1 5/2003 Lin et al.
2002/0020045 A1 2/2002 Nasu et al.

(Continued)

FOREIGN PATENT DOCUMENTS

DE 10149206 A1 2/2003
DE 10334203 A1 3/2005

(Continued)

OTHER PUBLICATIONS

International Search Report issued May 26, 2009 in PCT/JP09/054311 filed Mar. 6, 2009.

(Continued)

*Primary Examiner* — Fadey Jabr
*Assistant Examiner* — Thomas Ingram
(74) *Attorney, Agent, or Firm* — Oblon, McClelland, Maier & Neustadt, L.L.P.

(57) ABSTRACT

A GPS and a map information database acquire information regarding an arrow light which displays a signal for prohibiting travel in a particular direction, such as a red arrow light. A display and a loudspeaker supply information to a motorist of a host vehicle based on the information acquired by the GPS and the map information database, or a brake ECU and a brake actuator brake the host vehicle without depending on the manipulation by the motorist based on the information acquired by the GPS and the map information database. As a result, it is possible to correctly support driving even when a red arrow light or the like for prohibiting travel in a right turn direction.

12 Claims, 9 Drawing Sheets

(56) References Cited

U.S. PATENT DOCUMENTS

| | | | | |
|---|---|---|---|---|
| 2002/0198632 | A1* | 12/2002 | Breed et al. | 701/1 |
| 2003/0191568 | A1* | 10/2003 | Breed | 701/36 |
| 2006/0077050 | A1* | 4/2006 | Takahashi | 340/435 |
| 2008/0253615 | A1* | 10/2008 | Kubota et al. | 382/104 |
| 2008/0266072 | A1* | 10/2008 | Suzuki | 340/438 |
| 2010/0045482 | A1 | 2/2010 | Strauss | |
| 2010/0076621 | A1* | 3/2010 | Kubotani et al. | 701/1 |
| 2010/0292895 | A1* | 11/2010 | Nakamura et al. | 701/41 |
| 2011/0029195 | A1* | 2/2011 | Yamada et al. | 701/36 |
| 2012/0095646 | A1* | 4/2012 | Ghazarian | 701/36 |

FOREIGN PATENT DOCUMENTS

| | | | | |
|---|---|---|---|---|
| DE | 102006046697 | A1 | | 4/2008 |
| DE | 102007048809 | A1 | | 7/2008 |
| JP | 2000 099889 | | | 4/2000 |
| JP | 2002 150485 | | | 5/2002 |
| JP | 2004 348287 | | | 12/2004 |
| JP | 2005 247265 | | | 9/2005 |
| JP | 2005 263012 | | | 9/2005 |
| JP | 2005247265 | A | * | 9/2005 |
| JP | 2006163828 | A | * | 6/2006 |
| JP | 2007-232573 | | | 9/2007 |
| JP | 2008 305101 | | | 12/2008 |
| WO | WO 2006/088916 | A2 | | 8/2006 |
| WO | WO 2007/042931 | A1 | | 4/2007 |
| WO | WO 2008126389 | A1 | * | 10/2008 |

OTHER PUBLICATIONS

English translation of the International Preliminary Report on Patentability issued Oct. 27, 2011, in PCT/JP2009/054311.

* cited by examiner

VEHICLE DRIVE SUPPORT DEVICE

TECHNICAL FIELD

The present invention relates to a vehicle drive support device, and more particularly, to a vehicle drive support device that performs drive support by acquiring information on arrow lights.

BACKGROUND ART

In the related arts, there has been proposed a vehicle drive support device that performs drive support based on an illumination state of a traffic signal. For example, patent literature 1 discloses a vehicle drive support system including a vehicle drive support device and a traffic signal. The traffic signal includes display means having a plurality of traffic lights, control means for controlling the display means, and transmitting means for transmitting illumination state information representing an illumination state of the display means to the vehicle drive support device.

The vehicle drive support device includes receiving means for receiving the illumination state information from the traffic signal, inter-vehicular distance detection means for periodically detecting the inter-vehicular distance with other front vehicles, vehicle speed detection means for detecting a speed of the host vehicle, departure determination means for determining departure availability based on the inter-vehicular distance and the vehicle speed in a case where the received illumination state information indicates that departure is allowed as in a green light, an arrow light, or the like, and alarm output means for outputting alarm if it is determined that departure is allowed.

CITATION LIST

Patent Literature

Japanese Unexamined Patent Application Publication No. 2005-247265

SUMMARY OF INVENTION

Technical Problem

However, in the U.S., even when the straight line is at a red light, a right turn (or a left turn in Japan) is allowed. If the right turn is prohibited at the red light, a red arrow light is used to display a red arrow signal. For this reason, if the departure is determined only by the illumination state of the arrow light as described above, it is impossible to appropriately respond in countries or regions where the right turn is prohibited using the red arrow light as in the U.S.

In addition, since not all the intersections in the U.S. are installed with the red arrow light, if a motorist fails to note the presence of the red arrow light at the intersection where information regarding the illumination state of the traffic signal is provided to a vehicle as described above, a motorist may determine that the right turn is allowed even when information is being supplied regarding the lighting of the red light in the straight direction, and may enter into the intersection.

The invention provides a vehicle drive support device capable of correctly supporting driving even when an arrow light is installed for displaying a signal for prohibiting travel in a particular direction.

Solution to Problem

According to the invention, there is provided a vehicle drive support device including: an arrow light information acquisition unit that acquires information regarding an arrow light which displays a signal for prohibiting travel in a particular direction; and a drive assistant operation unit that supplies information to a motorist of a host vehicle based on the information acquired by the arrow light information acquisition unit or drives the host vehicle without depending on manipulation by the motorist based on the information acquired by the arrow light information acquisition unit.

According to this configuration, the arrow light information acquisition unit acquires information regarding the arrow light which displays a signal for prohibiting or permitting travel in a particular direction, such as a red arrow light, and the drive assistant operation unit supplies information to a motorist of the host vehicle based on the information acquired by the arrow light information acquisition unit or drives the host vehicle without depending on manipulation by the motorist based on the information acquired by the arrow light information acquisition unit. Therefore, for example, even when the arrow light which displays a signal for prohibiting travel in a particular direction, such as a red arrow light, is installed, it is possible to correctly carry out the drive support.

According to the invention, there is provided a vehicle drive support device including: an arrow light information acquisition unit that acquires information regarding an arrow light which displays a signal for prohibiting travel in a particular direction; and a drive assistant operation unit that supplies information to a motorist of a host vehicle based on the information acquired by the arrow light information acquisition unit or drives the host vehicle without depending on manipulation by the motorist based on the information acquired by the arrow light information acquisition unit.

According to this configuration, the arrow light information acquisition unit acquires information regarding the arrow light which displays a signal for prohibiting travel in a particular direction, such as a red arrow light, and the drive assistant operation unit supplies information to a motorist of the host vehicle based on the information acquired by the arrow light information acquisition unit or drives the host vehicle without depending on manipulation by the motorist based on the information acquired by the arrow light information acquisition unit. Therefore, even when the arrow light which displays a signal for prohibiting travel in a particular direction, such as a red arrow light, is installed, it is possible to correctly carry out the drive support.

In this case, it is preferable that the vehicle drive support device further include a travel direction detection unit that detects a travel direction of the host vehicle, and, in a case where a travel direction of the host vehicle detected by the travel direction detection unit corresponds with a direction in which a signal of the arrow light relating to the information acquired by the arrow light information acquisition unit prohibits travel, the drive assistant operation unit supplies information or drives the host vehicle.

According to this configuration, in a case where a travel direction of the host vehicle detected by the travel direction detection unit corresponds with a direction in which a signal of the arrow light relating to the information acquired by the arrow light information acquisition unit prohibits travel, the drive assistant operation unit supplies information or drives the host vehicle. Therefore, it is possible to supply information or the like when the travel of the host vehicle is likely to be prohibited by the arrow light, and thus, the drive support is really necessary.

In this case, it is preferable that the arrow light information acquisition unit acquire information regarding an illumination state of the arrow light, and the drive assistant operation unit supply information or drive the host vehicle when the arrow light relating to the information acquired by the arrow light information acquisition unit displays a signal for prohibiting travel in a particular direction.

According to this configuration, the drive assistant operation unit supplies information or drives the host vehicle when the arrow light relating to the information acquired by the arrow light information acquisition unit displays a signal for prohibiting travel in a particular direction. Therefore, it is possible to supply information or the like when the travel of the host vehicle is prohibited by the arrow light, and thus, the drive support is surely necessary.

In addition, it is preferable that the vehicle drive support device further include a vehicle traffic signal information acquisition unit that acquires information regarding an illumination state of a vehicle traffic signal which displays a signal for prohibiting travel in a straight direction; and an accelerator pedal sensor that detects whether or not an accelerator pedal of the host vehicle is pressed, wherein, in a case where the vehicle traffic signal relating to the information acquired by the vehicle traffic signal information acquisition unit displays a signal for prohibiting travel in a straight direction, and the arrow light relating to the information acquired by the arrow light information acquisition unit displays a signal for prohibiting travel in a particular direction, and in a case where a travel direction of the host vehicle detected by the travel direction detection unit is a straight direction, the drive assistant operation unit supplies information or drives the host vehicle when the accelerator pedal sensor detects a pressing amount of the accelerator pedal, and wherein in a case where the travel direction of the host vehicle detected by the travel direction detection unit corresponds with a direction in which a signal of the arrow light relating to the information acquired by the arrow light information acquisition unit prohibits the travel, the drive assistant operation unit supplies information or drives the host vehicle without depending on whether or not the accelerator pedal sensor detects a pressing amount of the accelerator pedal.

According to this configuration, in a case where the vehicle traffic signal relating to the information acquired by the vehicle traffic signal information acquisition unit displays a signal for prohibiting travel in a straight direction, and the arrow light relating to the information acquired by the arrow light information acquisition unit displays a signal for prohibiting travel in a particular direction, and in a case where a travel direction of the host vehicle detected by the travel direction detection unit is a straight direction, the drive assistant operation unit supplies information or drives the host vehicle when the accelerator pedal sensor detects a pressing amount of the accelerator pedal. Therefore, it is possible to carry out a necessary drive support such as information supply when the host vehicle travels straight despite the fact that travel in a straight direction is prohibited, the accelerator pedal is pressed, and the motorist fails to recognize the red light for prohibiting travel in a straight direction.

Meanwhile, in a case where the host vehicle carries out the right turn in a direction in which travel is prohibited by the arrow light, it is highly likely that the motorist will reduce a speed of the host vehicle for the right turn or the like by manipulating the brake or the like even when the accelerator pedal is not pressed. Therefore, when the travel direction of the host vehicle detected by the travel direction detection unit corresponds with a direction in which the signal of the arrow light relating to the information acquired by the arrow light information acquisition unit prohibits travel, the drive assistant operation unit supplies information or drives the host vehicle without depending on whether or not the accelerator pedal sensor detects a pressing amount of the accelerator pedal. Therefore, it is possible to carry out a necessary drive support such as information supply when the motorist fails to recognize the red arrow light or the like for prohibiting travel in a right turn direction.

In addition, it is preferable that the vehicle drive support device further include a vehicle speed sensor for detecting a speed of the host vehicle, wherein, in a case where the vehicle speed sensor detects that a speed of the host vehicle exceeds a threshold value, the drive assistant operation unit supplies information with more information, a longer information supply time, a higher information supply frequency, or a higher attention degree, and drives the host vehicle with more manipulation, a longer time, or a higher manipulation frequency in comparison with a case where the vehicle speed sensor detects that a speed of the host vehicle is equal to or lower than the threshold value.

At the timing for carrying out the drive support such as information supply, when the speed of the host vehicle is high, it is highly likely that the motorist will fail to recognize the presence of the red arrow light or the like. Therefore, according to this configuration, in a case where the vehicle speed sensor detects that the speed of the host vehicle exceeds a threshold value, the degree of the drive support increases in comparison with a case where the case where the vehicle speed sensor detects that the speed of the host vehicle exceeds a threshold value. Therefore, it is possible to carry out the drive support when the drive support is really necessary.

In addition, it is preferable that the vehicle drive support device further include a pedestrian detection unit that detects the possibility of the presence of a pedestrian who crosses a direction in which the signal of the arrow light relating to the information acquired by the arrow light information acquisition unit prohibits travel, wherein the drive assistant operation unit changes a timing for supplying information or a timing for driving the host vehicle depending on the possibility of the presence of a pedestrian detected by the pedestrian detection unit.

According to this configuration, the drive assistant operation unit changes a timing for carrying out the drive support or a timing for driving the host vehicle depending on the possibility of the presence of a pedestrian detected by the pedestrian detection unit. Therefore, it is possible to respond to a crossing pedestrian.

In this case, it is preferable that the pedestrian detection unit detect an illumination state of a pedestrian traffic signal for a pedestrian who crosses a direction in which a signal of the arrow light relating to the information acquired by the arrow light information acquisition unit prohibits travel, and, in a case where the pedestrian detection unit detects that the pedestrian traffic signal displays a signal for permitting crossing of a pedestrian, that the drive assistant operation unit expedite a timing for supplying information or a timing for driving the host vehicle in comparison with a case where the pedestrian detection unit detects that the pedestrian traffic signal displays a signal for prohibiting crossing of a pedestrian.

When the pedestrian traffic signal displays the green light for permitting crossing of a pedestrian, the possibility of the presence of a pedestrian is high. However, according to this configuration, in a case where the pedestrian detection unit detects that the pedestrian traffic signal displays a signal for permitting crossing of a pedestrian, the drive assistant operation unit expedites a timing for supplying information or a timing for driving the host vehicle in comparison with a case where the pedestrian detection unit detects that the pedestrian traffic signal displays a signal for prohibiting crossing of a pedestrian. Therefore, it is possible to reliably prevent travel of the host vehicle in spite of the presence of a pedestrian.

In addition, it is preferable that the pedestrian detection unit acquire information regarding an illumination state of the vehicle traffic signal which displays a signal for prohibiting travel in a straight direction, and in a case where the vehicle traffic signal relating to the information acquired by the pedestrian detection unit displays a signal for prohibiting travel in a straight direction, and the arrow light relating to the information acquired by the arrow light information acquisition unit displays a signal for prohibiting travel in a particular direction, that the drive assistant operation unit expedite a timing for supplying information or a timing for driving the host vehicle in comparison with a case where the vehicle traffic signal relating to the information acquired by the pedestrian detection unit displays a signal for permitting travel in a straight direction, and the arrow light relating to the information acquired by the arrow light information acquisition unit displays a signal for prohibiting travel in a particular direction.

When the vehicle traffic signal displays the red light or the like for prohibiting travel in a straight direction, and the red arrow light or the like displays a signal for prohibiting travel in a particular direction such as a right turn, the illumination state of a pedestrian signal is not clear. Meanwhile, in a case where the vehicle traffic signal displays the green light or the like for permitting travel in a straight direction, and the red arrow light or the like displays a signal for prohibiting the right turn, it is highly likely that the pedestrian signal is on green or the like for permitting crossing of a pedestrian. For this reason, in a case where the vehicle traffic signal displays the red light or the like for prohibiting travel in a straight direction, and the red arrow light or the like displays a signal for prohibiting travel in a particular direction such as the right turn, the motorist tends to determine that the possibility of the presence of a crossing pedestrian is low regardless of the illumination state of the pedestrian signal when the motorist fails to note the presence of the red arrow light or the like.

For this reason, in a case where the vehicle traffic signal relating to the information acquired by the pedestrian detection unit displays a signal for prohibiting travel in a straight direction, and the arrow light relating to the information acquired by the arrow light information acquisition unit displays a signal for prohibiting travel in a particular direction, the drive assistant operation unit expedites a timing for supplying information or a timing for driving the host vehicle in comparison with a case where the vehicle traffic signal relating to the information acquired by the pedestrian detection unit displays a signal for permitting travel in a straight direction, and the arrow light relating to the information acquired by the arrow light information acquisition unit displays a signal for prohibiting travel in a particular direction. Therefore, it is possible to reliably prevent travel of the host vehicle in spite of the presence of a pedestrian.

Furthermore, it is preferable that the pedestrian detection unit detect the presence of a pedestrian who crosses a direction in which a signal of the arrow light relating to the information acquired by the arrow light information acquisition unit prohibits travel based on communication between the pedestrian and the host vehicle, and, in a case where the pedestrian detection unit detects the presence of a pedestrian who crosses a direction in which a signal of the arrow light relating to the information acquired by the arrow light information acquisition unit prohibits travel, that the drive assistant operation unit expedite a timing for supplying information or a timing for driving the host vehicle in comparison with a case where the pedestrian detection unit does not detect the presence of a pedestrian who crosses a direction in which a signal of the arrow light relating to the information acquired by the arrow light information acquisition unit prohibits travel.

According to this configuration, in a case where the pedestrian detection unit detects the presence of a pedestrian who crosses a direction in which a signal of the arrow light relating to the information acquired by the arrow light information acquisition unit prohibits travel through communication between the pedestrian and the host vehicle, the drive assistant operation unit expedites a timing for supplying information or a timing for driving the host vehicle in comparison with a case where the pedestrian detection unit does not detect the presence of a pedestrian who crosses a direction in which the signal of the arrow light relating to the information acquired by the arrow light information acquisition unit prohibits travel. Therefore, it is possible to reliably prevent travel of the host vehicle when a pedestrian really exists.

Advantageous Effects of Invention

In the vehicle drive support device according to the invention, it is possible to correctly carry out the drive support even when the arrow light for displaying a signal for prohibiting travel in a particular direction is installed.

DESCRIPTION OF EMBODIMENTS

Figure 1:
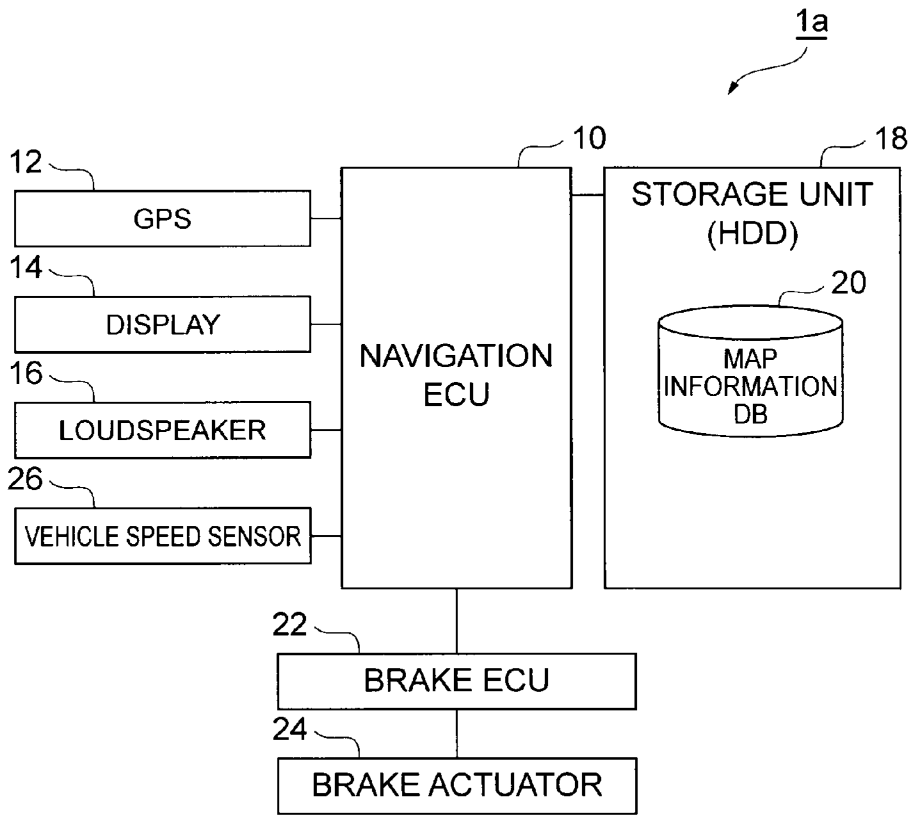
FIG. 1 is a block diagram illustrating a configuration of a vehicle drive support device according to a first embodiment.

Hereinafter, a vehicle drive support device according to a first embodiment of the invention will be described with reference to the accompanying drawings. As shown in FIG. 1, the vehicle drive support device 1*a* according to the present embodiment is configured by connecting a GPS 12, a display 14, a loudspeaker 16, a storage unit (HDD) 18, a map information DB 20, a brake ECU 22, and a vehicle speed sensor 26 to a navigation ECU 10. The vehicle drive support device 1*a* according to the present embodiment is a device mounted on the host vehicle to carry out drive support by acquiring information regarding the red arrow light for prohibiting a right turn as in the U.S. or information regarding other traffic signals.

The GPS (Global Positioning System) 12 receives signals from a plurality of GPS satellites through the GPS receiver and measures the position of the host vehicle from the differences of each signal.

The display 14 is, specifically, a display for the navigation system to attract attention of the motorist of the host vehicle to the red arrow light or the red light. The loudspeaker 16 is used to attract attention of the motorist of the host vehicle to the red arrow light or the red light using sound.

The storage unit (HDD: hard disk drive) 18 has a map information DB 20 storing map information, which allows the navigation ECU 10 to acquire position measurement information of the host vehicle acquired by the GPS 12 and information regarding the red arrow light at the point where the host vehicle travels or other traffic signals.

The brake ECU 22 is used to carry out a brake control by activating the brake actuator 24 based on instructions from the navigation ECU 10.

The vehicle speed sensor 26 is used to detect a speed of the host vehicle by detecting a rotation speed of a wheel axis.

The navigation ECU 10 carries out route guidance for a motorist of the host vehicle based on information acquired by the GPS 12 and the map information DB 20, supplies information to a motorist of the host vehicle through the display 14 or the loudspeaker 16 based on information regarding the red arrow light or the like acquired by the GPS 12 and the map information DB 20, or carries out a drive support for stopping the host vehicle without depending on manipulation by the motorist by activating the brake ECU 22.

In addition, the vehicle drive support device 1*a* according to the present embodiment may be provided with a front camera for acquiring information regarding the front direction of the host vehicle, such as an illumination state of the red arrow light. A yawing angle sensor may be provided for detecting the yawing angle of the host vehicle in order to estimate the travel direction of the host vehicle. Alternatively, illumination information of the direction indicator may be outputted to the navigation ECU 10 in order to estimate the travel direction of the host vehicle.

Figure 2:
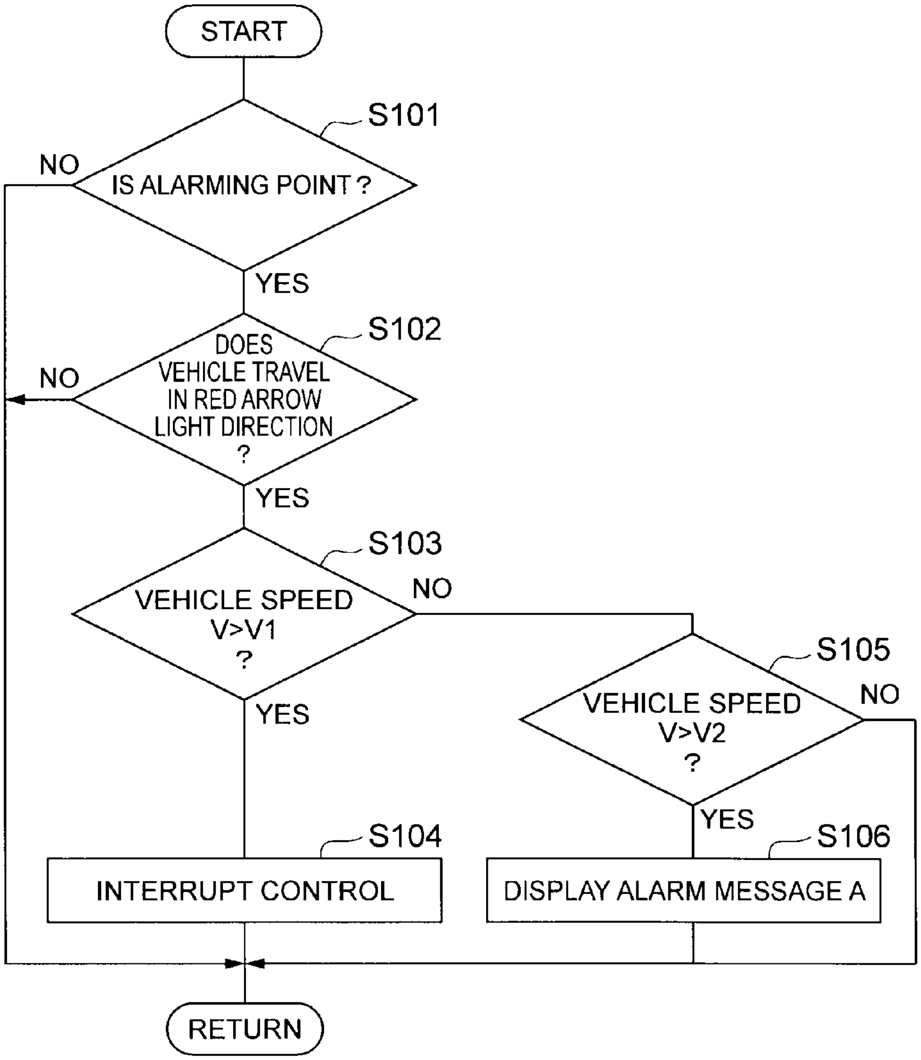
FIG. 2 is a flowchart illustrating operation of the vehicle drive support device according to a first embodiment.
Figure 3:
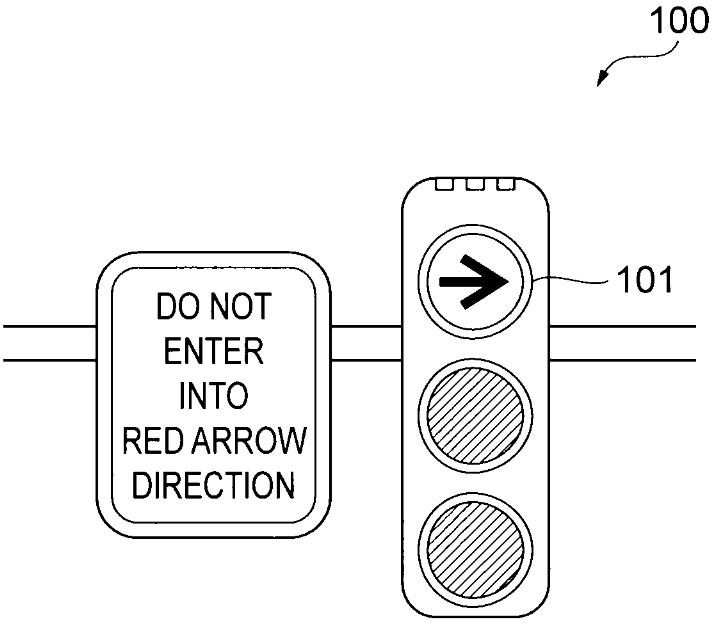
FIG. 3 is a diagram illustrating a traffic signal having a red arrow light.

Hereinafter, operation of the vehicle drive support device 1*a* according to the present embodiment will be described. As shown in the flowchart of FIG. 2, it is assumed that the host vehicle with the vehicle drive support device 1*a* according to the present embodiment is positioned in an alarm location (S101). As shown in FIG. 3, in the alarm location, a vehicle traffic signal 100 is provided for prohibiting right turn using the red arrow light 101.

The navigation ECU 10 estimates the travel direction of the host vehicle based on the information regarding the route in the middle of the route guidance stored in a memory of the navigation ECU 10 and determines whether or not the host vehicle is travel in a direction in which the travel is prohibited by the red arrow light 101 (S102). Alternatively, in this case, the navigation ECU 10 may estimate the travel direction of the host vehicle based on the yawing angle sensor provided in the host vehicle. Alternatively, in this case, the navigation ECU 10 may acquire information regarding the illumination state of the direction indicator and estimate the travel direction of the host vehicle based on the illumination state of the direction indicator. Alternatively, if the position measurement accuracy of the GPS 12 is sufficiently high, the travel direction of the host vehicle may be estimated based on the travel lane of the host vehicle.

If the host vehicle travels in a direction in which the travel is prohibited by the red arrow light (S102), and a vehicle speed V detected by the vehicle speed sensor 26 exceeds a predetermined threshold value V1 (5 to 20 km/h) (S103), the navigation ECU 10 outputs an instruction signal to the brake ECU 22 and activates the brake actuator 24 to stop the vehicle without depending on manipulation by the motorist (S104).

Figure 4:
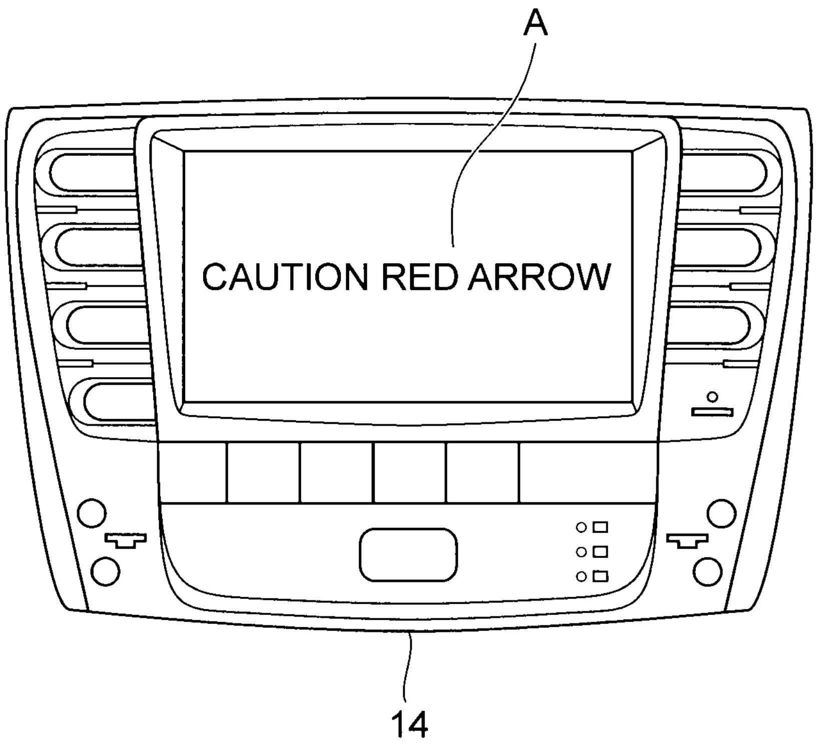
FIG. 4 is a diagram illustrating an indication on a display for attracting attention to the red arrow light.

Meanwhile, if the host vehicle travels in a direction in which travel is prohibited by the red arrow light (S102), and the vehicle speed V detected by the vehicle speed sensor 26 is equal to or lower than a predetermined threshold value V1 (S103, but is higher than V2 (1 to 10 km/h) (S105), the navigation ECU 10 performs control such that an alarm message A for attracting attention to the presence of the red arrow light as shown in FIG. 4 is displayed on the display 14, and an alarm sound is notified through the loudspeaker 16 (S106). Meanwhile, if the vehicle speed V detected by the vehicle speed sensor 26 is equal to or lower than V2 (S105), the navigation ECU 10 does not carry out drive support using the display 14, the loudspeaker 16, and the brake ECU 22.

According to the present embodiment, the GPS 12 and the map information DB 20 acquire information regarding the arrow light for displaying a signal for prohibiting travel into a particular direction, such as the red arrow light 101. Based on the information acquired by the GPS 12 and the map information DB 20, the display 14 and the loudspeaker 16 supply information to the motorist of the host vehicle, or the brake ECU 22 and the brake actuator 24 brake the host vehicle without depending on manipulation by the motorist. Therefore, even when the arrow light for displaying a signal for prohibiting travel into a particular direction, such as the red arrow light 101, is provided, it is possible to carry out correct drive support.

According to the present embodiment, in a case where a travel direction of the host vehicle detected from the memory of the navigation ECU 10 in the middle of the route guidance corresponds with a direction in which the travel is prohibited by the signal of the red arrow light 101 relating to information acquired by the GPS 12 and the map information DB 20, the display 14 and the loudspeaker 16 supply information, and the brake ECU 22 and the brake actuator 24 brake the host vehicle. Therefore, it is possible to supply information or the like when the travel of the host vehicle is likely to be prohibited by the red arrow light 101, and thus, the drive support is really necessary.

If the speed of the host vehicle is very high when the drive support such as supply of information are carried out, the motorist is highly likely to fail to recognize the presence of the red arrow light or the like. Therefore, according to the present embodiment, when the vehicle speed sensor 26 detects that the speed of the host vehicle exceeds the threshold value V1 or V2, it is possible to carry out really necessary drive support by increasing a drive support level in comparison with a case where the vehicle speed sensor detects that the speed of the host vehicle is equal to or lower than the threshold value.

Figure 5:
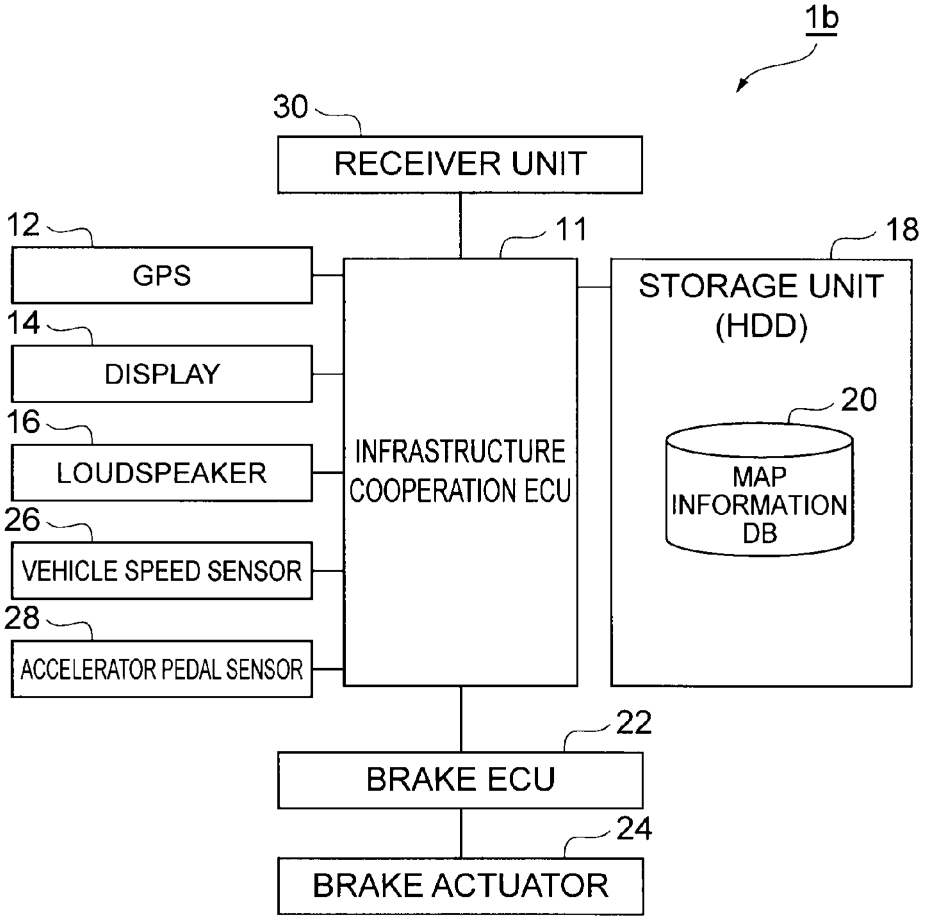
FIG. 5 is a block diagram illustrating a configuration of the vehicle drive support device according to a second embodiment.

Hereinafter, a second embodiment of the invention will be described. As shown in FIG. 5, in the vehicle drive support device 1*b* according to the present embodiment, the GPS 12, the display 14, the loudspeaker 16, the storage unit 18, the map information DB 20, the brake ECU 22, and the vehicle speed sensor 26 are connected to the infrastructure cooperation ECU 11 as in the first embodiment. In addition, the accelerator pedal sensor 28 and the receiver unit 30 are connected.

The accelerator pedal sensor 28 is used to detect the pressing amount of the accelerator pedal of the host vehicle. The receiver unit 30 is, specifically, an optical communication unit for DSRC (Dedicated Short Range Communication), an optical signal receiver, a vehicle-vehicle communication unit, or a pedestrian-vehicle communication unit. The receiver unit 30 acquires information regarding the illumination state of the red arrow light 101 transmitted from optical signal transmitters of road utilities or other vehicles or information regarding the illumination state of the traffic signal in the straight direction or the illumination state of the pedestrian signal, or acquires information regarding pedestrians from the information transmitted from an RFID (Radio Frequency Identification) or a communication unit worn by a pedestrian.

The infrastructure cooperation ECU 11 carries out route guidance for the motorist of the host vehicle based on the information acquired by the GPS 12 and the map information DB 20, provides information to the motorist of the host vehicle using the display 14 or the loudspeaker 16 based on the information acquired by the GPS 12 and the map information DB 20, the information acquired by the receiver unit 30 from the road utilities, and the detection result of the accelerator pedal sensor 28, or carries out a drive support for the brake ECU 22 to stop the host vehicle without depending on manipulation of the motorist.

Also in the present embodiment, a front camera for acquiring information regarding the front direction of the host vehicle such as an illumination state of the red arrow light 101 or the like may be provided.

Figure 6:
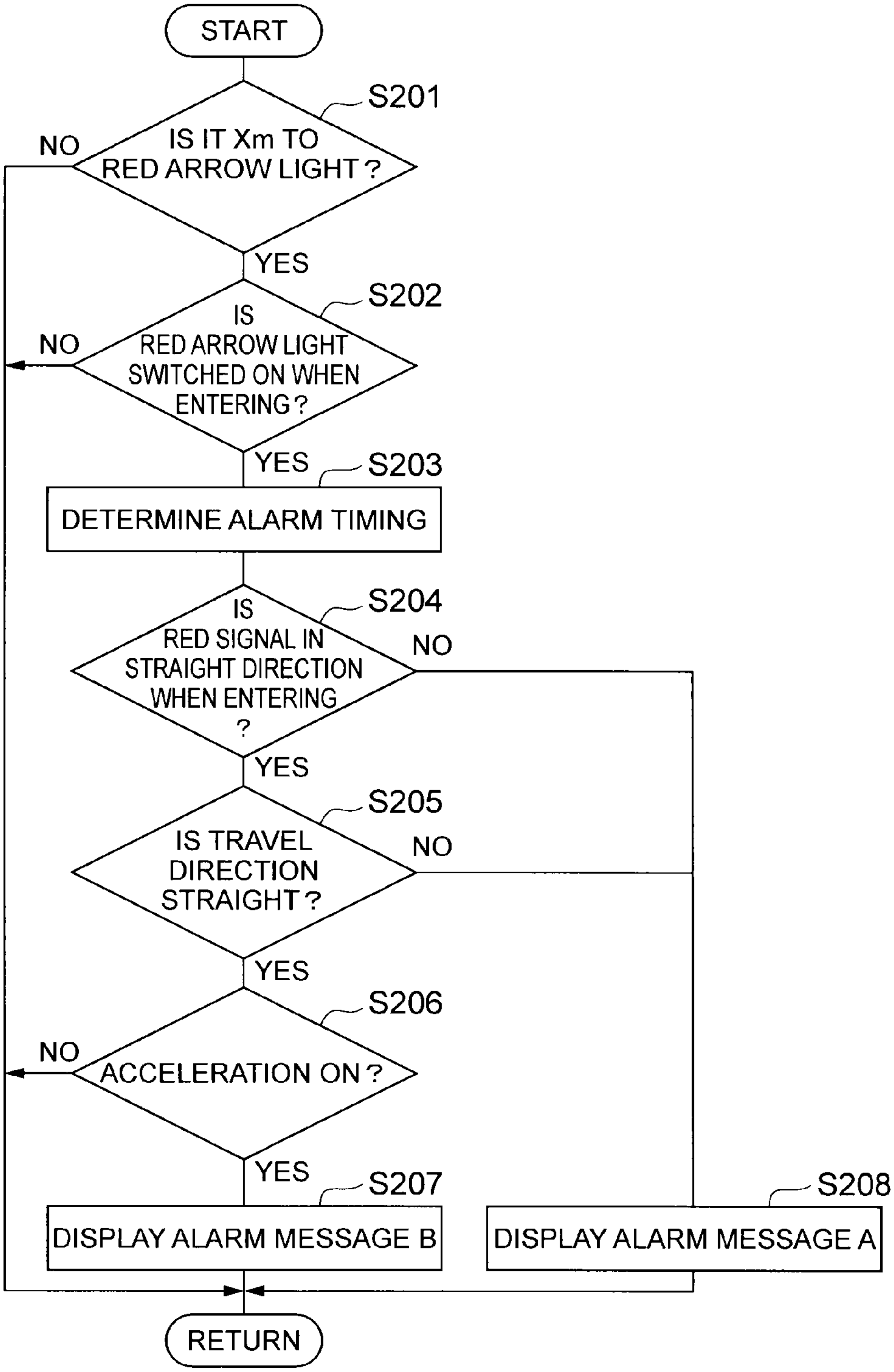
FIG. 6 is a flowchart illustrating operation of the vehicle drive support device according to a second embodiment.

Hereinafter, operation of the vehicle drive support device 1*b* according to the present embodiment will be described. As shown in FIG. 6, it is assumed that the host vehicle approaches the red arrow light 101 shown in FIG. 3 within X meters (5 to 50 m) (S201). If it is anticipated that the red arrow light 101 is displayed when the host vehicle enters into an intersection, based on the information acquired by the GPS 12 and the map information DB 20 and the information acquired by the receiver unit 30 from the road utilities and the like (S202), the infrastructure cooperation ECU 11 determines an alarm timing (S203).

According to the present embodiment, an alarm timing is determined depending on the possibility of the presence of a pedestrian. The pedestrian signal and neighboring signals are sequentially changed, for example, in the order of a green pedestrian signal, a flashing green pedestrian signal, a red pedestrian signal, a red arrow light signal, and a green straight direction signal. In a case where the pedestrian signal is on green or a flashing green, the possibility of the presence of a crossing pedestrian is high.

In this regard, when the pedestrian signal neighboring the red arrow light 101 is on green or a flashing green using the receiver unit 30, the infrastructure cooperation ECU 11 expedites the alarm timing for attracting attention to the red arrow light 101 shown in FIG. 3 using the display 14 and the loudspeaker 16 by 0.5 to 15 seconds in comparison with when the pedestrian signal is on red. As a result, by expediting the alarm, it is possible to prevent a vehicle from entering into an intersection in spite of a high possibility of the presence of a pedestrian. Similarly, the infrastructure cooperation ECU 11 may expedite the alarm timing using the display 14 and the loudspeaker 16 by 0.5 to 15 seconds, for several seconds immediately after the red pedestrian signal is displayed, or when the lanes intersecting with the straight direction of the host vehicle are on red.

Figure 7:
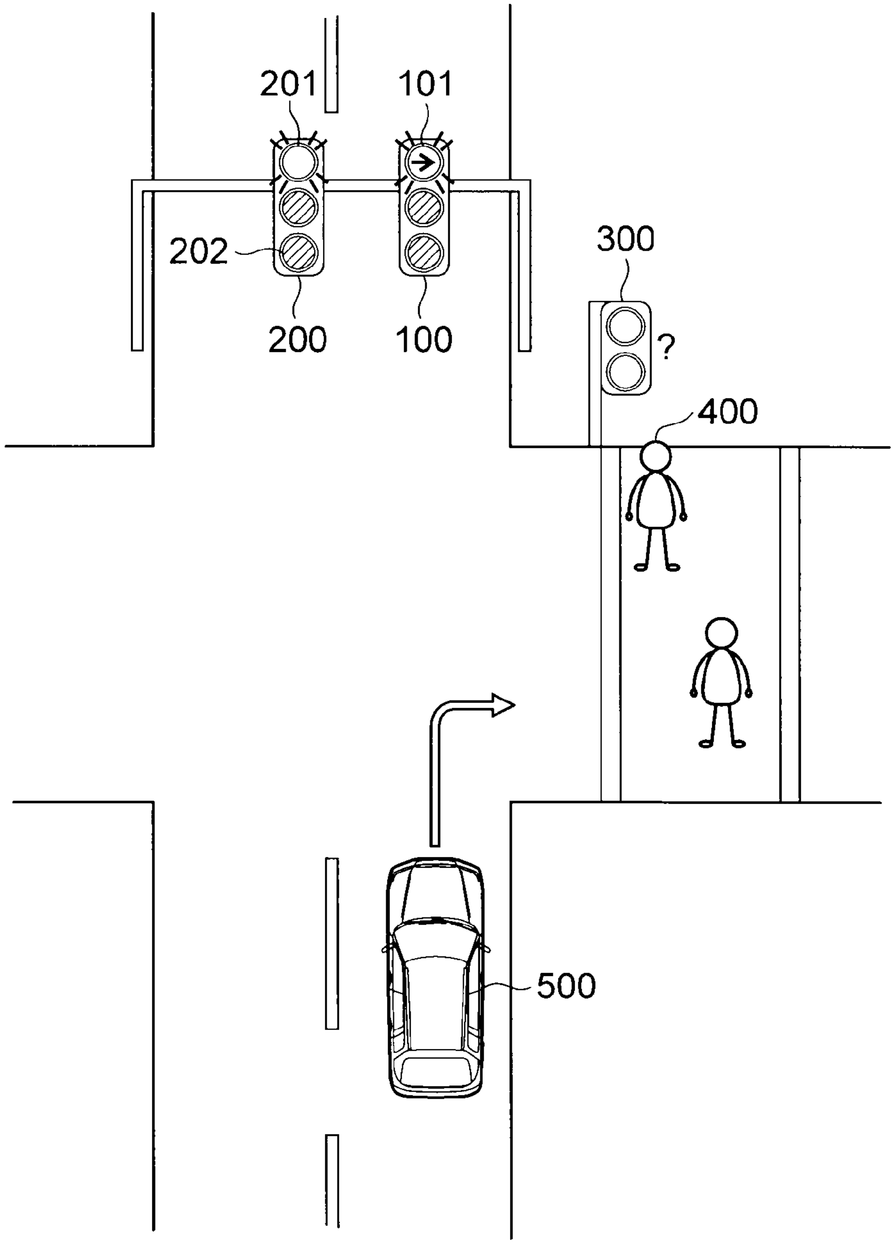
FIG. 7 is a plan view illustrating a situation where a traffic signal for a straight direction is on red, and a red arrow light for right turn is displayed.

In addition, as shown in FIG. 7, in a case where a vehicle traffic signal 100 indicating the red arrow light 101, a vehicle traffic signal 200 indicating a red light 201 or a green light 202 of the straight direction, and a pedestrian traffic signal 300 for crossing the lane intersecting with the straight direction of the host vehicle 500 are mounted at the intersection, the vehicle traffic signal 200 and the pedestrian traffic signal 300 have the following two states when the vehicle traffic signal 100 displays the red arrow light 101.

That is, when the vehicle traffic signal 200 of the straight direction displays the red light 201, and the vehicle traffic signal 100 displays the red arrow light 101 as shown in FIG. 7, the signal indicated by the pedestrian traffic signal 300 is not clear.

Figure 8:
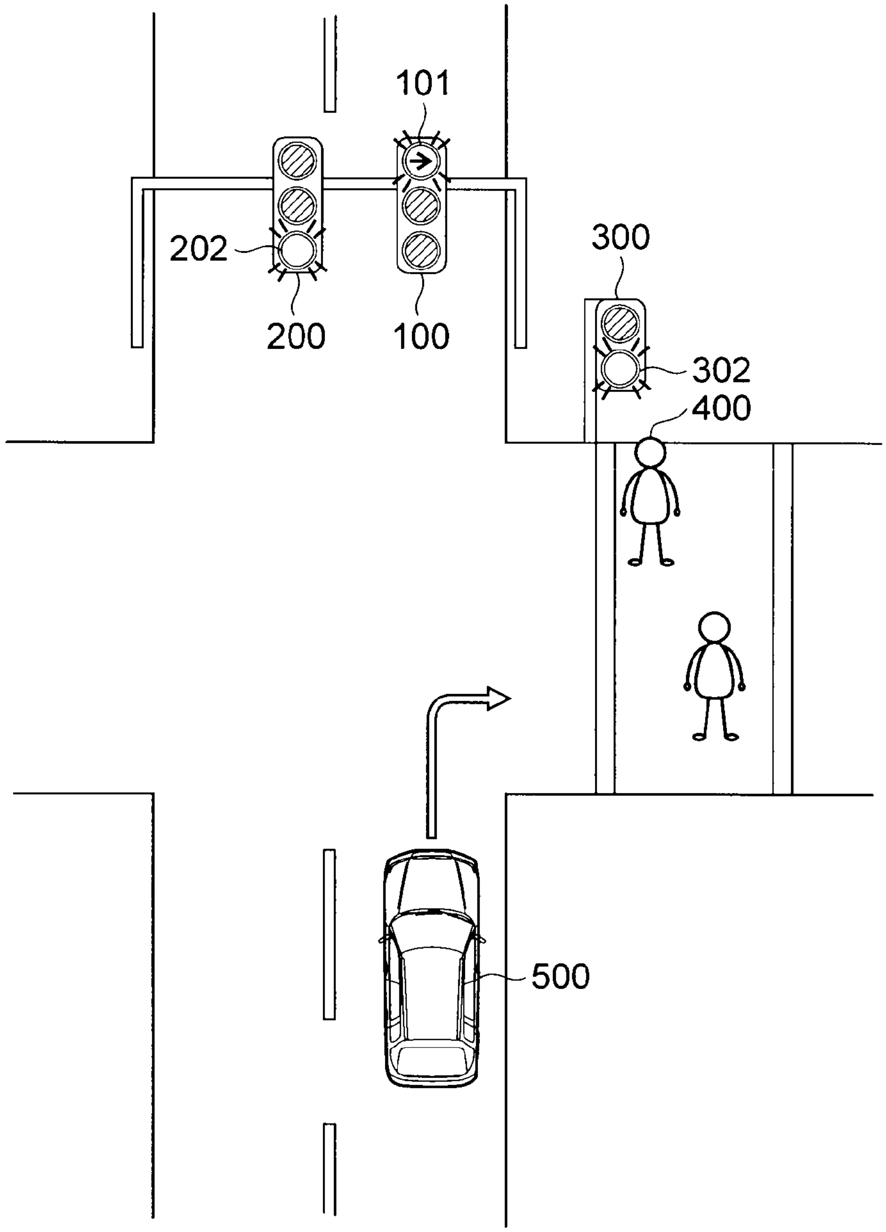
FIG. 8 is a plan view illustrating a situation where a traffic signal for a straight direction is on green, and a red arrow light for right turn is displayed.

Meanwhile, as shown in FIG. 8, when the vehicle traffic signal 200 of the straight direction displays the green light 202, and the vehicle traffic signal 100 displays the red arrow light 101, it is likely that the pedestrian traffic signal 300 will displays the green light 302.

Under this state, if the motorist of the host vehicle 500 fails to note the presence of the red arrow light 101, the motorist determines that the possibility of the presence of a pedestrian 400 is lower in the case of FIG. 7, that does not relate to the illumination state of the pedestrian traffic signal 300, rather than the case of FIG. 8. Therefore, a possibility that the motorist determines that there is no pedestrian 400 regardless of whether or not a pedestrian 400 actually exists, and that the host vehicle enters into the intersection at high speed is higher in the case of FIG. 7 rather than the case of FIG. 8.

In this regard, the infrastructure cooperation ECU 11 expedites the alarm timing for attracting attention to the red arrow light 101 shown in FIG. 3 using the display 14 and the loudspeaker 16 by 0.5 to 15 seconds in the event that the vehicle traffic signal 200 the straight direction displays the red light 201, and the vehicle traffic signal 100 turns on the red arrow light 101 in comparison with the event that the vehicle traffic signal 200 displays the green light 202, and the vehicle traffic signal 100 turns on the red arrow light 101. As a result, it the case of FIG. 7, it is possible to prevent the motorist from driving the host vehicle into the intersection in a high speed.

Alternatively, the infrastructure cooperation ECU 11 may expedite the alarm timing for attracting attention to the red arrow light 101 shown in FIG. 3 using the display 14 and the loudspeaker 16 by 0.5 to 15 seconds only in a case where the receiver unit 30 receives the information transmitted from an RFID or a communication unit worn by the pedestrian 400 and detects the presence of a pedestrian 400. As a result, it is possible to make the motorist more quickly recognize the presence of the red arrow light 101 in a case where a pedestrian 400 actually exists.

Figure 9:
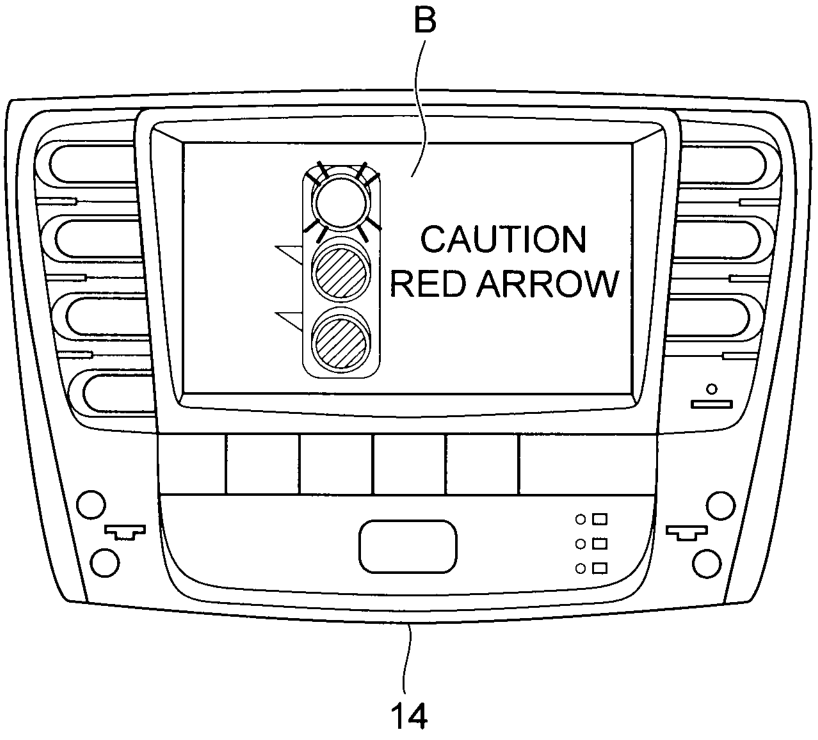
FIG. 9 is a diagram illustrating an indication on a display for attracting attention to the red arrow light and the red light.

Returning to FIG. 6, in a case where it is anticipated that the red light is displayed when the host vehicle enters into the intersection based on the information acquired by the GPS 12 and the map information DB 20 and information acquired by the receiver unit 30 from the road utilities (S204), and in a case where the travel direction of the host vehicle is straight based on the information regarding the route in the middle of the rout guidance stored in the memory of the infrastructure cooperation ECU 11 (S205), when the accelerator pedal sensor 28 detects that the accelerator pedal is pressed (S206), the infrastructure cooperation ECU 11 performs control such that an alarm message B for attracting attention to the red arrow light 101 and the red light 201 as shown in FIG. 9 is displayed on the display 14, and an alarm sound is given using the loudspeaker 16 (S207).

Meanwhile, when the accelerator pedal sensor 28 does not detect that the accelerator pedal is pressed (S206), it is thought that the motorist recognizes the red light 201. Therefore, the infrastructure cooperation ECU 11 does not sound the alarm.

In a case where it is anticipated that the red light 201 is not displayed when the host vehicle enters into the intersection based on the information acquired by the GPS 12 and the map information DB 20 and the information acquired by the receiver unit 30 from the road utilities and the like (S204), or in a case where the travel direction of the host vehicle is the right turn based on the information regarding the route in the middle of the route guidance stored in the memory of the infrastructure cooperation ECU 11 (S205), it is highly likely that the motorist will maintain a low vehicle speed for the right turn and fail to recognize the red arrow light 101 even when the accelerator pedal is not pressed, and the brake pedal is pressed. Therefore, the infrastructure cooperation ECU 11 performs control such that the alarm message A for attracting attention to the presence of the red arrow light is displayed on the display 14 as shown in FIG. 4, and the alarm is sounded using the loudspeaker 16 regardless of the pressing amount of the accelerator pedal detected by the accelerator pedal sensor 28 (S208).

In addition, according to the present embodiment, in addition to the alarming using the display 14 and the loudspeaker 16, the vehicle can be stopped using the brake ECU 22 and the brake actuator 24 without depending on manipulation by the motorist as in the first embodiment. Alternatively, according to the present embodiment, the drive support may be carried out by combining the method of changing the drive support mode based on the travel direction and the vehicle speed of the host vehicle of the first embodiment.

According to the present embodiment, when the red arrow light 101 relating to the information acquired by the GPS 12, the map information DB 20, and the receiver unit 30 displays the signal for prohibiting the right turn, the display 14 and the loudspeaker 16 supplies information, and the brake ECU 22 brakes the host vehicle 500. Therefore, the information supply or the like is carried out when the right turn of the host vehicle 500 is prohibited by the illuminating red arrow light 101, and thus, the drive support is surely necessary.

In addition, according to the present embodiment, in a case where the vehicle traffic signal 200 relating to the information acquired by the GPS 12, the map information DB 20, and the receiver unit 30 displays the red light 201 for prohibiting travel in the straight direction, the red arrow light 201 displays the signal for prohibiting the right turn, and the travel direction of the host vehicle 500 is straight based on the information regarding the route guidance stored in the memory within the infrastructure cooperation ECU 11, the display 14 the loudspeaker 16 supplies information, and the brake ECU 22 brakes the host vehicle 500 without depending on manipulation by the motorist when the accelerator pedal sensor 28 detects the pressing amount of the accelerator pedal. Therefore, it is possible to carry out necessary drive support such as information supply when the host vehicle 500 goes straight despite the fact that travel in a straight direction is prohibited, the accelerator pedal is pressed, and the motorist fails to recognize the red light for prohibiting travel in a straight direction.

Meanwhile, in a case where the host vehicle carries out the right turn prohibited by the red arrow light 101, it is likely that the motorist will manipulate the brake for the purpose of turning right and reduce the speed of the host vehicle even when the accelerator pedal is not pressed. Therefore, when the travel direction of the host vehicle is the right turn direction, the display 14 and the loudspeaker 16 carry out the information supply regardless of whether or not the accelerator pedal sensor 28 detects the pressing amount of the accelerator pedal, and the brake ECU 22 brakes the host vehicle 500 without depending on the manipulation of the motorist. As a result, it is possible to carry out necessary drive support such as information supply when the motorist fails to recognize the red arrow light 101 for prohibiting travel in the right turn direction.

In addition, according to the present embodiment, the display 14 and the loudspeaker 16 change the timing for supplying information, and the brake ECU 22 changes the timing for braking the host vehicle 500 depending on the pedestrian presence possibility detected by the GPS 12, the map information DB 20, and the receiver unit 30. Therefore, it is possible to respond to a crossing pedestrian.

When the pedestrian traffic signal 300 displays the green light 302 for permitting the crossing of a pedestrian 400, the possibility of the presence of a pedestrian 400 is high. However, according to the present embodiment, in a case where the GPS 12, the map information DB 20, and the receiver unit 30 detect that the pedestrian traffic signal 300 displays the green light 302 for permitting crossing of a pedestrian 400, the display 14 and the loudspeaker 16 expedites the timing for supplying information, and the brake ECU 22 expedites the timing for braking the host vehicle 500 in comparison with a case where it is detected that the pedestrian traffic signal 300 displays the red light for prohibiting crossing of a pedestrian 400. Therefore, it is possible to reliably prevent processing of the host vehicle 500 in spite of the presence of the pedestrian 400.

When the vehicle traffic signal 200 displays the red light 201 for prohibiting travel in a straight direction, and the red arrow light 101 displays the signal for prohibiting right turn, the illumination state of the pedestrian signal 300 is not clear. Meanwhile, when the vehicle traffic signal 200 displays the green light 202 for permitting processing in a straight direction, and the red arrow light 101 displays the signal for prohibiting the right turn, the pedestrian signal 300 is highly likely to display the green light 302 for permitting crossing of a pedestrian 400. For this reason, in a case where the vehicle traffic signal 200 displays the red light 201, and the red arrow light 101 displays the signal for prohibiting the right turn, the motorist tends to determine that the possibility of the presence of a crossing pedestrian 400 is low regardless of the illumination state of the pedestrian signal 300 when the motorist fails to note the presence of the red arrow light 101.

Therefore, according to the present embodiment, in a case where the vehicle traffic signal 200 displays the red light 201 for prohibiting travel to a straight direction, and the red arrow light 101 displays the signal for prohibiting the right turn, the display 14 and the loudspeaker 16 expedites the timing for supplying information, and the brake ECU 22 expedites the timing for braking the host vehicle 500 in comparison with a case where the vehicle traffic signal 200 displays the green light 202 for prohibiting travel in a straight direction, and the red arrow light 101 displays the signal for prohibiting the right turn. Therefore, it is possible to reliably prevent travel of the host vehicle 500 in spite of the presence of a pedestrian 400.

Furthermore, according to the present embodiment, the receiver unit 30 detects the presence of a pedestrian 400 who crosses the right turn direction in which travel is prohibited by the red arrow light 101 based on communication between a pedestrian 400 and a host vehicle 500, the display 14 and the loudspeaker 16 expedite the timing for supplying information, and the brake ECU 22 expedites the timing for braking the host vehicle 500 in comparison with a case where the red arrow light 101 does not detect the presence of a pedestrian 400 who crosses the right turn direction in which travel is prohibited. Therefore, it is possible to reliably prevent travel of the host vehicle 500 when a pedestrian 400 really exists.

Hereinbefore, while embodiments of the invention have been described, the invention is not limited by the foregoing embodiments, and may be modified in various ways.

Industrial Applicability

According to the invention, it is possible to correctly carry out drive support even when there is installed a red arrow light or the like which displays a signal for prohibiting travel in a particular direction such as in the U.S.

REFERENCE SIGNS LIST

1*a*, 1*b* vehicle drive support device
10 navigation ECU
11 infrastructure cooperation ECU
12 GPS
14 display
16 loudspeaker
18 storage unit (HDD)
20 map information DB
22 brake ECU
24 brake actuator
26 vehicle speed sensor
28 accelerator pedal sensor
30 receiver unit
100 vehicle traffic signal
101 red arrow light
200 vehicle traffic signal
201 red light
202 green light
300 pedestrian traffic signal
302 green light
400 pedestrian
500 host vehicle

The invention claimed is:

1. A vehicle drive support device comprising:

a red arrow light information acquisition unit that acquires information regarding a red arrow light which displays a signal for prohibiting travel in a particular turning direction;

a drive assistant operation unit configured to supply information to a motorist of a host vehicle based on the information acquired by the red arrow light information acquisition unit and to drive the host vehicle without depending on manipulation by the motorist based on the information acquired by the red arrow light information acquisition unit, the drive assistant operation unit supplies the information to the motorist or drives the host vehicle dependent on a monitored state of the vehicle;

a travel direction detection unit that detects a travel direction of the host vehicle;

a vehicle traffic signal information acquisition unit that acquires information regarding an illumination state of a vehicle traffic signal which displays a signal for prohibiting travel in a straight direction; and an accelerator pedal sensor that detects whether or not an accelerator pedal of the host vehicle is pressed, wherein, in a case where a travel direction of the host vehicle detected by the travel direction detection unit corresponds with a direction in which a signal of the red arrow light relating to the information acquired by the red arrow light information acquisition unit prohibits travel, the drive assistant operation unit supplies information or drives the host vehicle, wherein, in a case where the vehicle traffic signal relating to the information acquired by the vehicle traffic signal information acquisition unit displays a signal for prohibiting travel in a straight direction, and the red arrow light relating to the information acquired by the red arrow light information acquisition unit displays a signal for prohibiting travel in the particular turning direction, and in a case where a travel direction of the host vehicle detected by the travel direction detection unit is a straight direction, the drive assistant operation supplies information or drives the host vehicle when the accelerator pedal sensor detects a pressing amount of the accelerator pedal, and wherein, in a case where the travel direction of the host vehicle detected by the travel direction detection unit corresponds with a direction in which a signal of the red arrow light relating to the information acquired by the red arrow light information acquisition unit prohibits the travel, the drive assistant operation unit supplies information or drives the host vehicle without depending on whether or not the accelerator pedal sensor detects a pressing amount of the accelerator pedal.

2. The vehicle drive support device according to claim 1, wherein the red arrow light information acquisition unit acquires information regarding an illumination state of the red arrow light, and the drive assistant operation unit supplies information or drives the host vehicle when the red arrow light relating to the information acquired by the red arrow light information acquisition unit displays a signal for prohibiting travel in the particular turning direction.

3. The vehicle drive support device according to claim 1, further comprising a vehicle speed sensor for detecting a speed of the host vehicle, wherein, in a case where the vehicle speed sensor detects that a speed of the host vehicle exceeds a threshold value, the drive assistant operation unit supplies information with more information, a longer information supply time, a higher information supply frequency, or a higher attention degree, and drives the host vehicle with more manipulation, a longer time, or a higher manipulation frequency in comparison with a case where the vehicle speed sensor detects that a speed of the host vehicle is equal to or lower than the threshold value.

4. A vehicle drive support device comprising:

a red arrow light information acquisition unit that acquires information regarding a red arrow light which displays a signal for prohibiting travel in a particular turning direction;

a drive assistant operation unit configured to supply information to a motorist of a host vehicle based on the information acquired by the red arrow light information acquisition unit and to drive the host vehicle without depending on manipulation by the motorist based on the information acquired by the red arrow light information acquisition unit, the drive assistant operation unit supplies the information to the motorist or drives the host vehicle dependent on a monitored state of the vehicle;

a travel direction detection unit that detects a travel direction of the host vehicle; and a pedestrian detection unit that detects a possibility of presence of a pedestrian who crosses a direction in which the red arrow light relating to the information acquired by the red arrow light information acquisition unit prohibits travel, wherein, in a case where a travel direction of the host vehicle detected by the travel direction detection unit corresponds with a direction in which a signal of the red arrow light relating to the information acquired by the red arrow light information acquisition unit prohibits travel, the drive assistant operation unit supplies information or drives the host vehicle, wherein the drive assistant operation unit changes a timing for supplying information or a timing for driving the host vehicle depending on the possibility of presence of a pedestrian detected by the pedestrian detection unit, wherein the pedestrian detection unit detects an illumination state of a pedestrian traffic signal for a pedestrian who crosses a direction in which a signal of the red arrow light relating to the information acquired by the red arrow light information acquisition unit prohibits travel, and wherein, in a case where the pedestrian detection unit detects that the pedestrian traffic signal displays a signal for permitting crossing of a pedestrian, the drive assistant operation unit expedites a timing for supplying information or a timing for driving the host vehicle in comparison with a case where the pedestrian detection unit detects that the pedestrian traffic signal displays a signal for prohibiting crossing of a pedestrian.

5. The vehicle drive support device according to claim 4, wherein the red arrow light information acquisition unit acquires information regarding an illumination state of the red arrow light, and the drive assistant operation unit supplies information or drives the host vehicle when the red arrow light relating to the information acquired by the red arrow light information acquisition unit displays a signal for prohibiting travel in the particular turning direction.

6. The vehicle drive support device according to claim 4, further comprising a vehicle speed sensor for detecting a speed of the host vehicle, wherein, in a case where the vehicle speed sensor detects that a speed of the host vehicle exceeds a threshold value, the drive assistant operation unit supplies information with more information, a longer information supply time, a higher information supply frequency, or a higher attention degree, and drives the host vehicle with more manipulation, a longer time, or a higher manipulation frequency in comparison with a case where the vehicle speed sensor detects that a speed of the host vehicle is equal to or lower than the threshold value.

7. A vehicle drive support device comprising:

a red arrow light information acquisition unit that acquires information regarding a red arrow light which displays a signal for prohibiting travel in a particular turning direction;

a drive assistant operation unit configured to supply information to a motorist of a host vehicle based on the information acquired by the red arrow light information acquisition unit and to drive the host vehicle without depending on manipulation by the motorist based on the information acquired by the red arrow light information acquisition unit, the drive assistant operation unit supplies the information to the motorist or drives the host vehicle dependent on a monitored state of the vehicle;

a travel direction detection unit that detects a travel direction of the host vehicle; and a pedestrian detection unit that detects a possibility of presence of a pedestrian who crosses a direction in which a signal of the red arrow light relating to the information acquired by the red arrow light information acquisition unit prohibits travel, wherein, in a case where a travel direction of the host vehicle detected by the travel direction detection unit corresponds with a direction in which a signal of the red arrow light relating to the information acquired by the red arrow light information acquisition unit prohibits travel, the drive assistant operation unit supplies information or drives the host vehicle, wherein the drive assistant operation unit changes a timing for supplying information or a timing for driving the host vehicle depending on the possibility of presence of a pedestrian detected by the pedestrian detection unit, wherein the pedestrian detection unit acquires information regarding an illumination state of a vehicle traffic signal which displays a signal for prohibiting travel in a straight direction, and wherein, in a case where the vehicle traffic signal relating to the information acquired by the pedestrian detection unit displays a signal for prohibiting travel in a straight direction, and the red arrow light relating to the information acquired by the red arrow light information acquisition unit displays a signal for prohibiting travel in the particular turning direction, the drive assistant operation unit expedites a timing for supplying information or a timing for driving the host vehicle in comparison with a case where the vehicle traffic signal relating to the information acquired by the pedestrian detection unit displays a signal for permitting travel in a straight direction, and the red arrow light relating to the information acquired by the red arrow light information acquisition unit displays a signal for prohibiting travel in the particular turning direction.

8. The vehicle drive support device according to claim 7, wherein the red arrow light information acquisition unit acquires information regarding an illumination state of the red arrow light, and the drive assistant operation unit supplies information or drives the host vehicle when the red arrow light relating to the information acquired by the red arrow light information acquisition unit displays a signal for prohibiting travel in the particular turning direction.

9. The vehicle drive support device according to claim 7, further comprising a vehicle speed sensor for detecting a speed of the host vehicle, wherein, in a case where the vehicle speed sensor detects that a speed of the host vehicle exceeds a threshold value, the drive assistant operation unit supplies information with more information, a longer information supply time, a higher information supply frequency, or a higher attention degree, and drives the host vehicle with more manipulation, a longer time, or a higher manipulation frequency in comparison with a case where the vehicle speed sensor detects that a speed of the host vehicle is equal to or lower than the threshold value.

10. A vehicle drive support device comprising:

a red arrow light information acquisition unit that acquires information regarding a red arrow light which displays a signal for prohibiting travel in a particular turning direction;

a drive assistant operation unit configured to supply information to a motorist of a host vehicle based on the information acquired by the red arrow light information acquisition unit and to drive the host vehicle without depending on manipulation by the motorist based on the information acquired by the red arrow light information acquisition unit, the drive assistant operation unit supplies the information to the motorist or drives the host vehicle dependent on a monitored state of the vehicle;

a travel direction detection unit that detects a travel direction of the host vehicle; and a pedestrian detection unit that detects a possibility of presence of a pedestrian who crosses a direction in which a signal of the red arrow light relating to the information acquired by the red arrow light information acquisition unit prohibits travel, wherein, in a case where a travel direction of the host vehicle detected by the travel direction detection unit corresponds with a direction in which a signal of the red arrow light relating to the information acquired by the red arrow light information acquisition unit prohibits travel, the drive assistant operation unit supplies information or drives the host vehicle, wherein the drive assistant operation unit changes a timing for supplying information or a timing for driving the host vehicle depending on the possibility of presence of a pedestrian detected by the pedestrian detection unit, wherein the pedestrian detection unit detects presence of a pedestrian who crosses a direction in which a signal of the red arrow light relating to the information acquired by the red arrow light information acquisition unit prohibits travel based on communication between the pedestrian and the host vehicle, wherein, in a case where the pedestrian detection unit detects presence of a pedestrian who crosses a direction in which a signal of the red arrow light relating to the information acquired by the red arrow light information acquisition unit prohibits travel, the drive assistant operation unit expedites a timing for supplying information or a timing for driving the host vehicle in comparison with a case where the pedestrian detection unit does not detect presence of a pedestrian who crosses a direction in which a signal of the red arrow light relating to the information acquired by the red arrow light information acquisition unit prohibits travel.

11. The vehicle drive support device according to claim 10, wherein the red arrow light information acquisition unit acquires information regarding an illumination state of the red arrow light, and the drive assistant operation unit supplies information or drives the host vehicle when the red arrow light relating to the information acquired by the red arrow light information acquisition unit displays a signal for prohibiting travel in the particular turning direction.

12. The vehicle drive support device according to claim 10, further comprising a vehicle speed sensor for detecting a speed of the host vehicle, wherein, in a case where the vehicle speed sensor detects that a speed of the host vehicle exceeds a threshold value, the drive assistant operation unit supplies information with more information, a longer information supply time, a higher information supply frequency, or a higher attention degree, and drives the host vehicle with more manipulation, a longer time, or a higher manipulation frequency in comparison with a case where the vehicle speed sensor detects that a speed of the host vehicle is equal to or lower than the threshold value.

* * * * *